Sept. 17, 1957  G. K. TRUESDALE  2,806,658
FILM EDITOR
Filed June 23, 1954  2 Sheets-Sheet 1
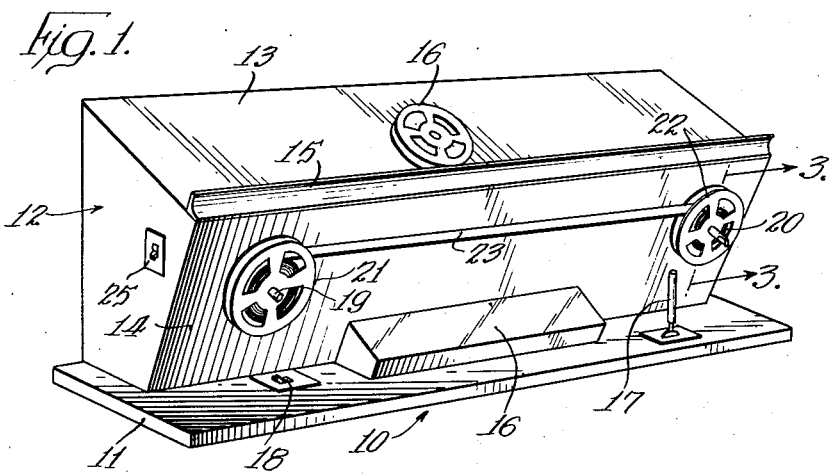
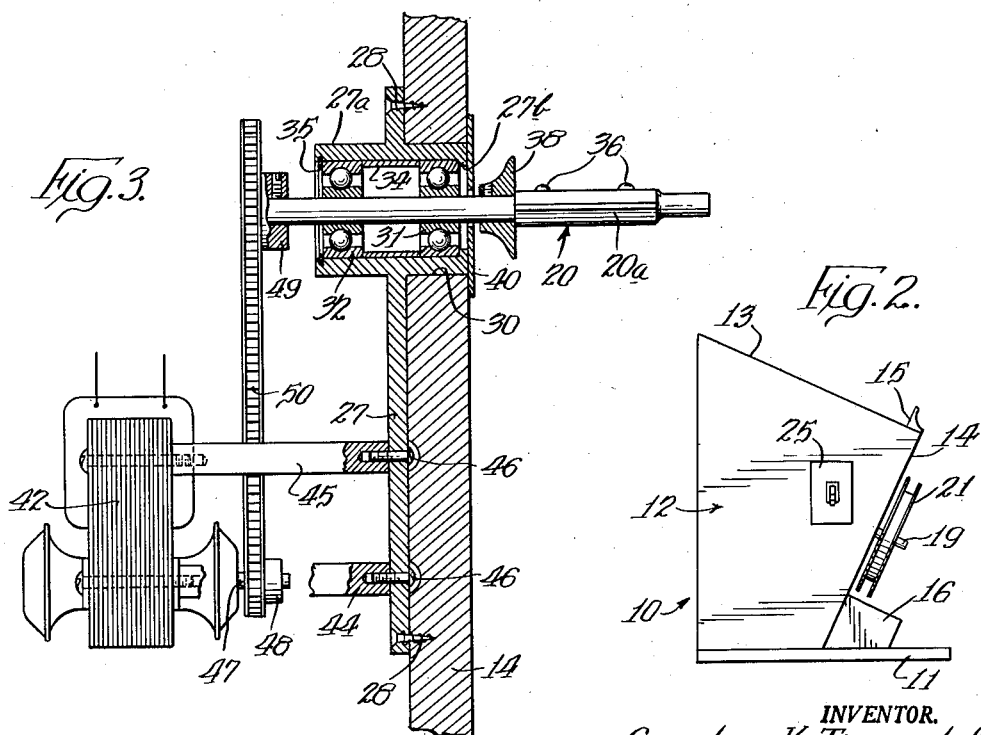
INVENTOR.
Gordon K. Truesdale
BY
Mason, Kolehmainen, Rathburn & Wyss
Attys.

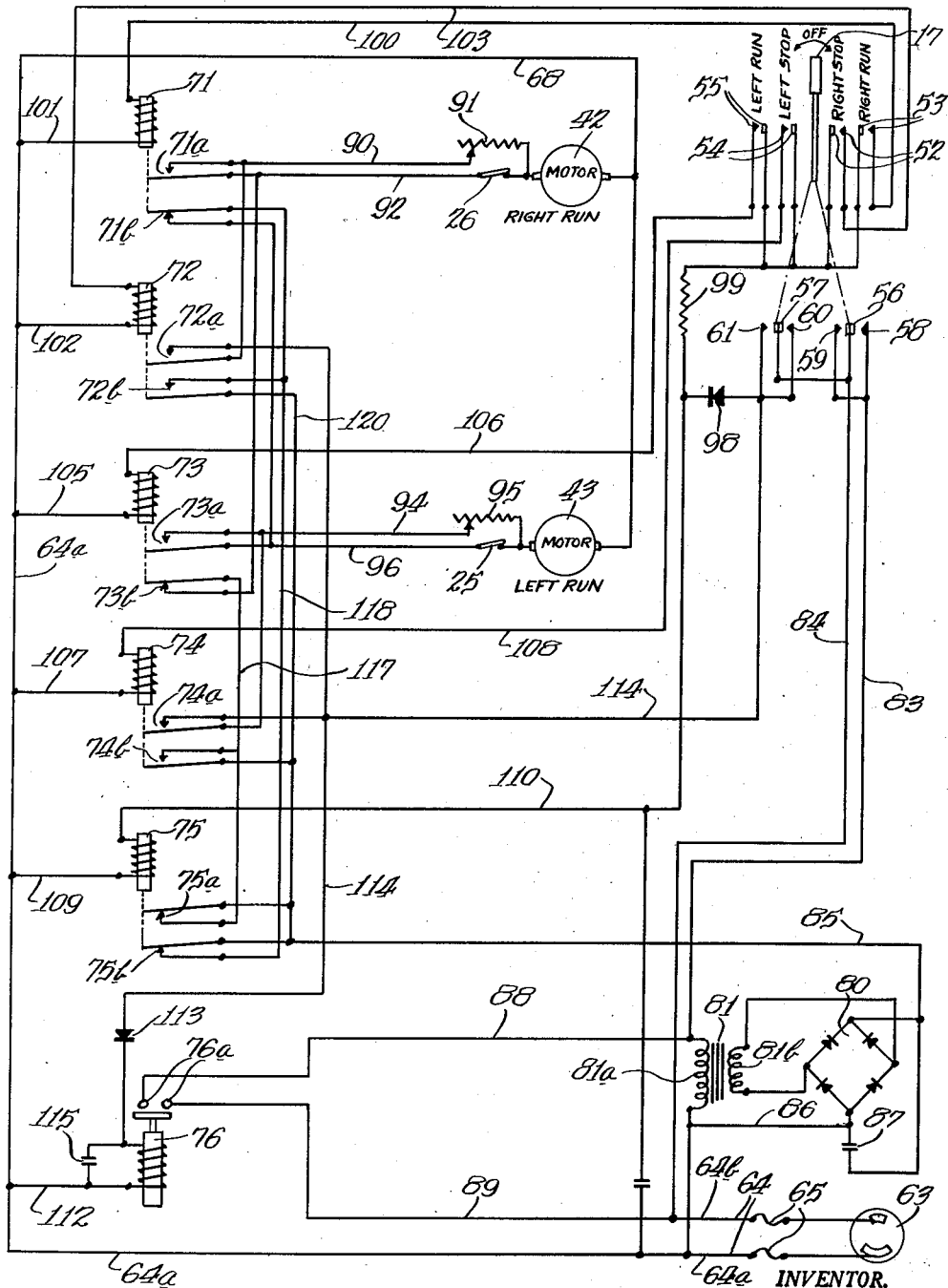

United States Patent Office 2,806,658
Patented Sept. 17, 1957

2,806,658

FILM EDITOR

Gordon K. Truesdale, Morton Grove, Ill., assignor to A. C. Nielsen Company, Chicago, Ill., a corporation of Illinois Application June 23, 1954, Serial No. 438,659

3 Claims. (Cl. 242—55.12)

The present invention relates to a film editor or film editing machine adapted to edit film carrying photographic information.

It has been common practice in recent years to obtain numerous records on photographic film. Everyone, of course, is familiar with the moving picture camera and the process of taking photographic records on such film. However, in recent years there has been extensive use of film type recorders to record all sorts of information. Many industrial applications for such recorders have been found wherever it is desirable to make continuous records, or at least records that are produced on continuous strips of film, which film is subsequently developed and then edited, following which the appropriate information contained thereon is converted to some other form. It is obvious that in certain applications extensive editing of such film is necessary. Parts must be cut out, other parts must be checked, and the like. In recent years records on film have been made, for example, of the tuning condition of wave signal receivers. The records of the tuning conditions of a large number of receivers are periodically received at a central point, such as an analysis organization, and the information contained on these films must be taken off and converted to some other form which, for the particular application mentioned, must be in a form useful to radio or television advertisers. Just as in any film applications, it is essential that editing of the film be accomplished before the film is used in automatic readers and the like, to make sure that in a continuous length of film all sections thereof are proper.

A film editor commonly includes a pair of reel mounting shafts spaced apart so that film may be wound from one reel to the other. Usually some means for viewing the film, such as a source of light or the like, is provided, so that the person editing the film can readily see what is involved. It would be desirable to provide a film editor with automatic winding facilities for winding the film in either direction with simple means for preventing the film from moving too rapidly during an unwinding operation thereof. Such a film editor should preferably also provide more than one speed so that under certain conditions the film may be moved at a very high speed and at other times at lower speeds. It should also provide an arrangement in which the film may be wound from one reel onto two reels in those situations where it is necessary to separate out two different subjects. Such a film editor should permit rapid reversal from high speed movement in one direction to high speed movement in the other direction without delay and without danger at any time of tearing the film. It should be capable of accommodating all types of film, whether provided with sprocket holes or not, and in all conditions of operation desirable braking action should be available when required.

Accordingly, it is an object of the present invention to provide a new and improved film editor having the desirable features noted above.

It is another object of the present invention to provide a film editor which is simple and compact and which is capable of giving long years of satisfactory service.

It is a further object of the present invention to provide a new and improved film editor which can be used by the operator with equal facilitiy whether the operator is sitting or standing.

Still another object of the present invention resides in a new and improved film editor with automatic means for driving the film in either direction and including simple control means which by a mere flip of the hand provides movement in either direction or rapid stopping from motion in either direction.

It is another object of the present invention to provide a new and improved film editor in which at least one reel shaft is capable of accommodating a plurality of takeup reels so that films of two different classifications can be wound on separate reels from one supply reel.

It is still another object of the present invention to provide a new and improved film editor and control mechanism therefor in which no mechanical adjustments are necessary and yet in which a very flexible arrangement is provided.

It is another object of the present invention to provide a new and improved film editor in which the operator may stop the film during movement in either direction merely by grasping the reel or the film without either damaging the film or the mechanism.

It is another object of the present invention to provide a new and improved film editor which is provided with stop positions at which time the film may be moved manually in either direction by the operator.

It is another object of the present invention to provide a new and improved film editor in which winding speeds of at least ten feet per second are obtainable in either direction and in which the motive power for moving the film from one reel to another is sufficiently low so that no damage will occur to the film regardless of how the mechanism is operated, and the most delicate splice will not be damaged.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is a perspective view of a film editor embodying the present invention;

Fig. 2 is an end view of Fig. 1;

Fig. 3 is an enlarged sectional view taken on line 3—3 of Fig. 1; and

Fig. 4 is a schematic circuit diagram indicating the control circuit of the film editor of the present invention.

Briefly, the present invention comprises a supporting casing provided with suitable mounting means for reel shafts and associated holders for driving the same, and a suitable light to illuminate the film as it passes thereover. Each motor is directly associated with its reel drive shaft, and a five-position switch is provided which, in addition to the off position, includes a right run and a right stop position, as well as a left run and a left stop position. Means are provided for dynamically braking the motors to the stop positions. Upon stopping of the film movement, there is automatically applied a dynamic braking load to each motor for a brief instant to insure stopping thereof at any desired point.

Referring now to the drawings, and particularly to Figs. 1, 2 and 3 of the drawings, there is illustrated the film editor of the present invention, generally designated by the reference numeral 10. This film editor comprises a base 11 upon which is suitably mounted a housing 12 within which the control circuits, motors and the like are contained. In accordance with the present invention, the housing 12 has a peculiar configuration. The rear wall of the housing is disposed in a vertical position, but the top wall 13 is disposed at an angle so that the elevation thereof is lower at the front of the housing than at the rear. A front wall 14 is likewise disposed at an angle, so that effectively the front wall 14 of the housing leans forward at the top as viewed in Figs. 1 and 2 of the drawings. In an embodiment constructed in accordance with the present invention, the front panel 14 was disposed at an angle of 65 degrees with the base 11. It will be apparent as the following description proceeds that the angle of the front panels determines the angle of the film, and with such an arrangement the operator may readily view the film while either sitting or standing, which would not be the case if the front panel were vertical, as is the rear panel of the housing 12.

The housing 12 is suitably secured to the base 11, as indicated in Fig. 1 of the drawings, and a strip 15 is secured to the front edge of the top panel 13 to define a sort of ledge on which to put things, such as a spare reel 16 illustrated in Fig. 1, resting on the sloping top panel 13. It will be apparent that the top panel 13 also provides a writing surface. As illustrated in Fig. 1, the base 11 preferably extends forwardly of the housing 12 to support certain equipment such as a housing 16 for a suitable light, a master control switch 17, and a switch 18, which switch 18 is preferably a switch for controlling the light disposed in the housing 16. Preferably the housing 16 accommodates a conventional fluorescent light, not shown, so that a substantial area beneath the film being edited is illuminated. The particular construction and positioning of the light associated with the film editor forms no part of the present invention, although the construction illustrated has been found to be very satisfactory.

In accordance with the present invention, there projects through the front panel 14 two reel shafts specifically designated as 19 and 20. These reel shafts have their axes disposed perpendicular to the panel 14, and, hence, in view of the angular disposition of the panel 14, their axes project downwardly to some extent. As illustrated in Fig. 1 of the drawings, associated with the shaft 19 is the reel 21, and associated with the shaft 20 is a reel 22, between which there extends the film 23. Either the reel 21 or the reel 22 may be the supply or takeup spool for any particular instance, since the film can readily be moved in either direction. In accordance with the present invention at least one of the reel shafts 19 or 20 is sufficiently long so that it will accommodate two reels in those cases where it is desirable to wind the film from one reel onto two separate reels. The reel shaft 20 has been illustrated as longer than the reel shaft 19 so to accommodate two reels, although, obviously, those shafts could both be long, or shaft 19 could be long and shaft 20 could be short.

In order to provide certain control functions, a pair of switches 25 and 26 are mounted on housing 12. As illustrated, these switches are mounted one on each end of housing 12, and, hence, switch 26 is not visible, although schematically illustrated in Fig. 4 of the drawings.

For the purpose of rotating the reel shafts 19 or 20 in either direction, there are provided suitable motor means disposed within the housing 12. Since the motor means for each reel shaft is identical only one will be described in detail and, in Fig. 3 of the drawings, the means for driving the reel shaft 20 is shown in detail. To rotatably mount the reel shaft 20 there is provided a motor mounting plate 27 suitably secured to the inside surface of the panel 14 as by screws 28. It will be understood that the casing 12 may be made of any suitable material such as wood, plastic or the like. In a particular embodiment constructed in accordance with the present invention the panel 14 is a wood panel, and hence the fastening means 28 are indicated as wood screws. This is by way of example only however. The mounting plate 27 preferably includes as an integral part thereof a bearing housing designated as 27a which is adapted to extend into a suitable opening 30 defined in the front panel 14. The bearing housing 27a accommodates suitable roller bearings and associated bearing races designated as front roller bearings 31 and rear roller bearings 32, respectively, preferably separated by suitable spacer 34. The bearing housing 27a is indicated as having a peripheral flange 27b surrounding the bearing opening at the front thereof so that the front bearings 31 may be inserted followed by the spacer 34 and the rear bearings 32, the peripheral flange 27b limiting the maximum insertion of these elements. A suitable retaining ring 35 may be employed to hold these parts in assembled relationship. The roller bearings 31 and 32 rotatably mount the reel shaft 20 which includes a substantial portion extending outside the housing 12 with an enlarged portion 20a to suitably support the hub portion of a reel such as 16, 21 or 22, all of which have identical openings to receive the portion 20a of the reel shaft 20. A suitable reel retaining spring 36 is preferably included to maintain the reel in proper position. As illustrated, shaft 20 is long enough to accommodate two reels, and two retaining springs 36 may be provided. A reel stop collar 38 secured to the reel shaft 20 between the front panel 14 and the portion 20a of the reel shaft 20 is provided to determine the reel position. Thus the operator merely pushes the reel onto the shaft 20 until it engages the collar 38. If two reels are applied, then the second reel is moved against the first which is pushed against the collar 38. Preferably a decorative cover plate 40 is provided for the front of panel 14 around the opening 30 accommodating the bearing housing 27a and the reel shaft 20.

For the purpose of rotating the reel shaft 20 there is provided a suitable motor generally designated at 42. This motor 42 which might be termed the right run motor is schematically indicated in Fig. 4 of the drawings. There is also included an identical motor 43 also shown schematically in Fig. 4 which may be termed the left run motor and which is associated with the reel shaft 19 in identically the same manner as the motor 42 is associated with the reel shaft 20. The motor 43 has not been illustrated except schematically in Fig. 4 of the drawings, but, in view of the detail description of the control circuit included with Fig. 4, the arrangement and operation thereof will readily be appreciated by those skilled in the art. The motor 42 may be of any desired construction and has been illustrated as a shaded pole motor suitably supported from mounting posts 44 and 45 secured to the motor mounting plate 27 by suitable fastening means 46. The motor shaft 47 has secured thereto a suitable sprocket 48 in alignment with a sprocket 49 secured to the reel shaft 20. A sprocket chain 50 interconnects the sprockets 48 and 49 thereby drivingly relating the motor 42 to the reel shaft 20.

As has been mentioned above, it will be noted from Figs. 1 and 3 that the portion 20a of the reel shaft 20 is substantially longer than the corresponding portion of the reel shaft 19. This is to accommodate two reels, one directly in front of the other in those situations where it is desirable to supply material from reel 21 to two different reels. This has not been illustrated in the drawings, but will readily be appreciated by those skilled in the art. With this arrangement, moreover, films of two different classifications can be wound onto separate reels from a single reel.

For the purpose of operating the motors 42 and 43 and, hence, the reels 20 and 19 respectively in a desired manner in accordance with the present invention, there is provided for these motors a suitable control circuit best shown in Fig. 4 of the drawings. The only elements described thus far disclosed in Fig. 4 of the drawings are the switches 17, 25 and 26 and the motors 42 and 43. Before considering the control circuit, the switch 17 which has been schematically indicated in Fig. 4 of the drawings may first be considered. It is illustrated as a five-position switch including a center, off position. The switch 17 is movable to the right to a first position designated as a right stop position at which time a set of normally open right stop contacts 52 are closed. Further movement to the right of the switch 17 will additionally close a pair of normally open right run switch contacts 53. In the event that the switch is moved to the left of the stop position indicated in Fig. 4 of the drawings, similar left stop contacts 54 and left run contacts 55 are closed. All of these contacts are normally open contacts. The switch 17 further includes a pair of movable contact elements 56 and 57. The contact element 56 engages a contact 58 when the switch 17 is moved to the left of its off position, and a contact 59 when the switch 17 is moved to the right of its off position. Similarly, the contact 57 engages a contact 60 when the switch 17 is moved to the left of its off position and a contact 61 when it is moved to the right of its off position. The contacts 56 and 57 are power applying contacts which apply suitable power to certain control elements whenever the switch 17 is moved to any position other than the center or off position.

In order that the motors 42 and 43 may selectively be operated as the driving motors to drive the film 23 at high speed in either direction and to dynamically brake either one or both of these motors under certain situations, it is essential that both a source of alternating current energy as well as a source of direct current energy be available. To this end, the casing 12 is provided with a conventional connector, such for example as the schematically indicated twist lock connector 63 to which power may be supplied from any suitable source of alternating current. Thus the power lines 64, specifically designated at 64a and 64b connected to the connector 63, may be considered the alternating current source for the film editor 10. Suitable fuses 65 are indicated as included in the alternating current source to protect the various elements of the film editor of the present invention.

The power line 64a, which is also the negative line of the direct current source, as is brought out in detail hereinafter, is directly connected to one side of the windings of a plurality of control relays specifically indicated as 71, 72, 73, 74, 75, and 76, respectively. This line 64a is also connected through a conductor 68 with one side of the motors 42 and 43. The relay 71 may be termed a right run relay and is controlled by the contacts 53. The relay 72 may be termed a right stop relay and is controlled by the contacts 52. Similarly, the relay 73 may be termed a left run relay and is controlled by the contacts 55 while the relay 74 may be termed a left stop relay and is controlled by the contacts 54. The relay 75 on the other hand might be termed a direct current stopping voltage relay for insuring that a stop voltage is always applied when the switch 17 is moved to its off position. Finally, the relay 76 is a holding relay to insure that dynamic braking power is supplied to both motors through the contacts of relay 75 for an instant after the switch 17 has been moved to the off position. Direct current power is required for such momentary dynamic braking and the relay 76 insures that such direct current power remains available momentarily even though the control switch 17 is moved to the off position.

To provide a source of direct current dynamic braking potential, there is provided a full wave rectifier generally designated at 80. Alternating current potential is supplied to the full wave rectifier 80 through a suitable rectifier transformer 81 whose primary winding 81a is connected across the alternating current source 64 through the contact 56 and either the contacts 58 or 59, whenever the switch 17 is in any position except its off position. The circuit through primary winding 81a can readily be traced from power line 64a directly to one side of the winding 81a thence through the winding 81a through conductor 83 and either contact 58 or 59 through contact 56 and conductor 84 back to the other side of the power source, namely, line 64b. The secondary winding 81b of the transformer 81 is connected directly to the full wave rectifier 80. The positive terminal of the rectifier 80 is connected to the conductor 85 which supplies dynamic braking voltage to the motors 42 and 43 in dependence upon the condition of the relays 72, 74 and 75. The negative terminal of the full wave rectifier 80 is connected by means of a conductor 86 with conductor 64a which in turn is connected to the motors 42 and 43 through the conductor 68. A suitable smoothing capacitor 87 is connected across the direct current output of full wave rectifier 80.

To maintain direct current on the system momentarily after the switch 17 is moved to the off position, the relay 76 is provided with a pair of normally open contacts 76a which are connected in parallel with the circuit comprising conductors 83 and 84. As illustrated, one of the contacts 76a is connected by a conductor 88 with the conductor 83 and, hence, with one terminal of the primary winding 81a of the transformer 81. The other contact of the pair of contacts 76a is connected by conductor 89 with conductor 84 and, hence, also with the other side of the power line, namely 64b. Thus, when relay 76 is energized to close contacts 76a, the dynamic braking source of direct current voltage is maintained even though switch 17 is moved to the off position.

The relays 71, 72, 73, 74 and 75 which, like relay 76, are direct current relays, are provided to apply the proper voltages to the motors 42 and 43 for the different operating conditions desired. These relays will be described in detail with respect to performing the function which they are required to perform. The relay 71 which is the right run relay controls a set of normally open contacts 71a and a set of normally closed contacts 71b. The relay 72 is substantially the same as the relay 71 and is designated as the right stop relay. It comprises two sets of normally open contacts 72a and 72b. The left run relay 73 is identical with the right run relay 71 and comprises a set of normally open contacts 73a and a set of normally closed contacts 73b. The left stop relay 74 is identical with the right stop relay 72 and comprises two sets of normally open contacts 74a and 74b. Moreover, the direct current stopping relay 75 for the motors 42 and 43 comprises two sets of normally closed contacts designated as 75a and 75b.

For the purpose of completing the electrical circuits to the motors 42 and 43 through the relays 71 to 75, inclusive, the contacts 71a of the right run relay 71 are connected through conductors 90 and 92, respectively, to one terminal of the motor 42. One of the contacts 71a is connected through the conductor 90 and a suitable resistor 91 to the motor 42 while the other of the contacts 71a is connected through a conductor 92 and the switch 26 to the motor 42. The switch 26 is provided for the purpose of providing slow speed operation when that is desired. By opening the switch 26, the motor 42 will operate at a slower speed than when the switch 26 is closed. The left run relay 73 has its contacts 73a connected in identically the same manner with respect to the motor 43 as the contacts 71a of the right run relay 71 with respect to the motor 42. In other words, one of the contacts 73a is connected through a conductor 94 and an adjustable resistor 95 with the motor 43 while the other of the contacts 73a is connected through a conductor 96 and the switch 25 with the motor 43. For the purpose of supplying direct current energy to the relays 71, 72, 73, 74 and 75, there is provided a rectifier 98 which is connected through either contacts 60 or 61 and the switch contact 57 with the conductor 64b of the alternating current source through conductor 84 so that whenever the switch 17 is in other than its off position one side of the alternating current source is connected to the rectifier 98. The rectifier 98 is connected to supply direct current energy to the relays 71, 72, 73, and 74, through a suitable delay resistor 99 and the different contacts of the switch 17. Specifically, the winding of the relay 71 is connected through a conductor 100 and the right run contacts 53 of the switch 17 to the resistor 99 and thence to the rectifier 98. The other terminal of the winding of relay 71 is connected directly through a conductor 101 to conductor 64a which is the other side of the alternating current source. In a similar manner, the winding of the relay 72 is connected to the conductor 64a through a conductor 102 and is connected to the rectifier 98 through a conductor 103, the right stop contacts 52 of the switch 17 and the resistor 99. Similarly, the left run relay 73 is connected to the alternating current source conductor 64a through a conductor 105 and to the rectifier 98 through a conductor 106, the left run contacts 55 of the switch 17 and the resistor 99. In the same manner, the left stop relay 74 has its winding connected to the alternating current source conductor 64a through a conductor 107 and its other terminal connected to the rectifier 98 through a conductor 108, the left stop contacts 54 and the resistor 99.

The winding of the relay 75 has one terminal thereof also connected to the conductor 64a through a conductor 109 while its other terminal is connected through a conductor 110 directly to the rectifier 98. It will be apparent that relay 75 is energized whenever switch 17 is in any position other than its off position and by virtue of the delay resistor 99 which is always in series with the windings of the relays 71, 72, 73 and 74. The relay 75 will be energized slightly before either of the relays 71, 72, 73 or 74, thereby making sure that the motors 42 and 43 are not simultaneously supplied with an alternating current voltage and a dynamic braking voltage. This will become more apparent as the following description proceeds.

As was pointed out above, the holding relay 76 maintains the full wave rectifier 80 energized for a brief period of time following the movement of the switch 17 to the off position. The sole function of the direct current rectifier 80 as was pointed out above is to supply dynamic braking voltage to the motors 42 and 43. In order that this dynamic braking voltage may be supplied to both the motors 42 and 43 for an instant after the switch 17 is moved to the off position to make sure that the reels remain stationary, the relay 76 must remain energized momentarily after the switch 17 is moved to the open position. To this end, the winding of relay 76 is connected to one side of the alternating current source, namely, conductor 64a through a conductor 112. The other side of this winding is connected through a rectifier 113 and a conductor 114 through either the contacts 60 or 61 and the switch contact 56 with the alternating current source and specifically the conductor 64b through conductor 84. A suitable capacitor 115 is connected across the winding of the relay 76. This capacitor in a particular embodiment constructed in accordance with the present invention had a capacitance of 20 microfarads and the charge applied to this condenser 115 during the energization of the relay 76 was sufficient to maintain the winding of the relay 76 energized momentarily to delay opening of the contacts 76a for several seconds after the switch 17 is moved to the off position. Thus dynamic braking voltage was supplied by the rectifier 80 to the conductor 85 and to both the motors 42 and 43 as will become apparent from the following description.

It will be understood that the relays 71, 72, 73, 74 and 75 supply either alternating current voltage or direct current dynamic braking voltage to the motors 42 and 43 to provide the desired control of movement of the film 23 to the right or to the left and also to supply dynamic braking voltage in the stop positions to one or both motors selectively as the case may be and as will be brought out in the ensuing description.

In order to supply dynamic braking voltage to the motors 42 or 43 or to both of them simultaneously, the direct current potential from the full wave rectifier 80 is supplied through the conductor 85 to the motor 43 through the normally open contacts 72b of the right stopping relay 72 and the contacts 71b to the motor 42 through the normally open contacts 74b of the left stopping relay 74 and the contacts 73b; and to both motors through the sets of contacts 75a—73b and 75b—71b of the respective relays. Considering first the relay 75 and its two sets of normally closed contacts which are to provide direct current dynamic braking voltage to the motors 42 and 43, the contacts 75a supply positive voltage from conductor 85 through a conductor 117 and the normally closed contacts 73b of the relay 73 to the motor 42 through the conductor 92. Similarly, the contacts 75b supply the same positive potential from the conductor 85 through conductor 118 and the normally closed contacts 71b to the motor 43 through the conductor 96. Thus, with all of the relays 71 to 75 in the position indicated and the relay 76 momentarily energized, after the deenergization of all the other relays, it will be apparent that a dynamic braking voltage from the dynamic braking source comprising the rectifier 80, will be applied to both motors 42 and 43, thus making sure that these motors are stopped positively when the switch 17 is moved from any of its control positions to its off position as shown in Fig. 4. Since the relay 75, by virtue of resistor 99, is energized before any one of the relays 71, 72, 73 or 74 can be energized when the switch 17 is moved to other than its off position, dynamic braking is removed upon the opening of contacts 75a and 75b. In the right stop position, however, relays 72, 75 and 76 only are energized.

Considering now the circuit in the condition shown in Fig. 4 with the switch 17 in the open position, all parts of the circuit are deenergized. If the switch 17 is now moved to the right stop position, the full wave rectifier 80 for supplying dynamic braking power to the motors 42 and 43 is energized, and right stop relay 72, direct current stopping relay 75 and holding relay 76 are energized. It should furthermore be appreciated that in this sequence of events the direct current stopping relay 75 is energized before the relays 72 and 76. The energization of relay 72 supplies alternating current to right run motor 42 through the adjustable resistor 91 and dynamic braking voltage to motor 43. Alternating voltage through the resistor 91 supplied to motor 42 is insufficient to rotate the motor but is sufficient to provide a drag or a holding voltage. Thus the film 23 is held taut between the reels 21 and 22. The supply of alternating current to motor 42 can be traced from the line 114 to the normally open contacts 72a of the relay 72 and to the resistor 91 to motor 42 and then back through the other side of the alternating current circuit including conductor 64a and conductor 68. Since the left stopping relay 74 is not energized, such alternating current voltage cannot be supplied through resistor 95 to motor 43. Dynamic braking voltage, however, is supplied to motor 43 from the positive terminal of the direct current source through conductor 85, conductor 120, through the normally open contacts 72b of the relay 72, the normally closed contacts 71b of the relay 71 and through the switch 25 to the motor 43, and, of course, back through the conductor 68 to the other side of the direct current source. If from the right stop position the switch 17 were moved to the off position, all of the relays except 76 would immediately be deenergized and, upon deenergization of the relay 75, dynamic braking voltage would be applied to both motors 42 and 43 through the contacts 75a and 75b thereof by virtue of the fact that the relay 76 momentarily maintains this source of dynamic braking voltage on for several seconds after deenergization of the relay 75. Thus, the direct current stopping relay 75 provides a path for direct current stopping voltage to both motors when going from an operating position to or through the off position. Relay 75 opens this path to each motor whenever switch 17 is in any of its four positions other than the off position.

When the switch 17 is moved to the right run position, the contacts 52 and 53 are both closed which means that the relays 71, 72, 75 and 76 are energized. The energization of right run relay 71 causes the contacts 71a to short out the resistor 91 and thus alternating current power from conductor 114 is applied to motor 42 through contacts 72a of right stop relay 72 and contacts 71a of right run relay 71. The opening of contacts 71b removes the braking voltage from left run motor 43 whereupon motor 42 may run at maximum speed and move the film 21 toward the right. However, under these conditions when alternating current potential is applied to motor 42, the motor 43 is not energized in any way, and the inherent drag which it applies will be a very small load and apply a very small tension to the film 23. If, however, the switch 17 is moved from the right run to the right stop and then to the off position, both motors will be stopped rapidly.

The left run and left stop operation is substantially identical with that described for the right run and right stop operation, except that in the left stop position the relays 74, 75 and 76 are energized and in the left run position the relays 73, 74, 75 and 76 are energized. Considering the left stop position, the relay 74 is energized so as to place alternating current from conductor 114 on the motor 43 through the resistor 95 through contacts 74a of the relay 74. This is not sufficient to cause rotation of the motor 43 particularly when at the same time dynamic braking voltage is applied to the motor 42 from conductor 85 through conductor 120, through contacts 74b of the relay 74 and normally closed contacts 73b of the relay 73 to the motor 42 through switch 93. In the left run position with relay 73 energized in addition to relays 74, 75 and 76, maximum alternating current voltage from conductor 114 is applied to the motor 43 through switch 97 since, under this condition, the contacts 73a short out the resistor 95. Moreover, under this condition, the left run motor 43 runs at maximum speed and the motor 42 acts as a load to maintain the proper film tension. As in every situation when the switch 17 is moved to the off position indicated in Fig. 4 of the drawings, the relays 71, 72, 73, 74 and 75 immediately become deenergized while the relay 76 remains energized for several seconds to apply a dynamic braking voltage to both motors 42 and 43 through the contacts of the direct current stopping relay 75. Also, by virtue of the resistance 99 the relay 75 is always energized ahead of the relays 71, 72, 73 and 74 thereby preventing both alternating current and dynamic braking voltage from being simultaneously applied to one or both of the motors 42 or 43.

It will be appreciated that although relays have been described to perform the switching functions, actually the same thing could be accomplished with ganged switching. Greater flexibility is believed possible when using relays.

In view of the detailed description included above, the operation of the film editor of the present invention will readily be understood by those skilled in the art. Since the motors 42 and 43 are shaded pole motors of the type commonly employed to drive phonograph turntables, the tension applied to the film 23 is very low and will not damage the film or break the most delicate splice. Moreover, the operator can physically move the film 23 in either direction by hand when the switch 17 is in either of its stop positions or in its off position. The film may also be stopped by hand while running in either direction by holding the idling or feed reel. This may be done without damaging the mechanism or injuring the operator. The speed of the film travel may also be decreased by the operator manually braking the idling or feed reel by hand. Positive stopping is provided in both the left and right stop position as well as in the off position. Furthermore, the operator may actually stop the film by holding one of the reels even when in the right or left run position without damaging the mechanism. There are only two electrical adjustments involved, namely, the adjustable resistors 91 and 95 for controlling the magnitude of the low voltage alternating current applied to the motors 42 and 43, respectively, for taking up the slack in the stop position of a particular one of the motors. By virtue of the switches 25 and 26 which may be opened either singly or both at the same time, it is possible to get a controlled low speed operation under certain editing conditions when it might be desirable to move the film rapidly in one direction and then reverse and go back slowly in the other direction. As was mentioned above, the housing 12 is provided with switches 25 and 26 on the respective ends thereof, only the switch 25 being visible so that the operator may selectively turn off one or both to get this controlled slow speed operation in either the right or the left direction or in both if desired.

By virtue of the reel shafts of the film editor of the present invention not being mounted on a horizontal axis, when the film is all transferred to the driven reel and it continues to rotate the film will not wind around the motor shaft as will be the case where the reel shafts are disposed with their axes horizontal.

While a particular embodiment of the present invention has been illustrated, it will be appreciated by those skilled in the art that numerous changes and modifications are likely to occur to those skilled in the art. It is, therefore, aimed in the appended claims to cover all such changes and modifications which fall within the true spirit and scope of the present invention.

What is claimed as new and desired to be secured by Letters Patent of the United States is:

1. In a film editing device, a housing, a pair of reel shafts having their longitudinal axes disposed in spaced parallel relationship and mounted in one wall of said housing for rotation about said axes, a pair of reels one mounted on each of said shafts for supporting strip material having the ends thereof wound on said reels whereby said strip material may be moved from one reel to the other, a first motor drivingly connected to one of said shafts, a second motor drivingly connected to the other of said shafts, a multiposition switch having an off position, a right run position, a right stop position, a left run position and a left stop position, and a control circuit for said motors including means responsive to the positioning of said switch in said right run position to energize said first motor, means responsive to the positioning of said switch in said left run position to energize said second motor, means responsive to the positioning of said second switch in said right stop position to effectively deenergize said first motor and to apply a dynamic braking voltage to said second motor, means responsive to the positioning of said switch in said left stop position to deenergize said second motor and apply a dynamic braking voltage to said first motor, and means responsive to the positioning of said switch in said off position to apply a dynamic braking voltage to both of said motors.

2. The combination set forth in claim 1 wherein said multiposition switch includes an operating lever which when moved to the extreme left causes said switch to be in the said left run position, and as it is moved to the right sequentially causes the switch to be moved to the left stop position, to the off position, to the right stop position and finally to the right run position.

3. The combination set forth in claim 1 wherein said last-named means only momentarily applies said dynamic braking voltage to said motors when said switch is initially moved to said off position from either said left stop position or said right stop position.

References Cited in the file of this patent

UNITED STATES PATENTS

| | | |
|---|---|---|
| 1,939,181 | McCash et al. | Dec. 12, 1933 |
| 2,202,419 | Geuder | May 28, 1940 |
| 2,223,728 | Kenyon | Dec. 3, 1940 |
| 2,333,978 | Bowman | Nov. 9, 1943 |
| 2,419,476 | Begun | Apr. 22, 1947 |